United States Patent
Bhupatiraju et al.

(10) Patent No.: US 11,722,417 B2
(45) Date of Patent: Aug. 8, 2023

(54) TECHNIQUES FOR OPTIMIZING WIRELESS COMMUNICATIONS VIA DYNAMIC SLEW RATE CONTROL OF A WIRED COMMUNICATIONS CHANNEL

(71) Applicant: NVIDIA CORPORATION, Santa Clara, CA (US)

(72) Inventors: Srirama Bhupatiraju, San Jose, CA (US); Joselito Gavilan, San Jose, CA (US); Kiril Stoynov, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 17/117,023

(22) Filed: Dec. 9, 2020

(65) Prior Publication Data

US 2022/0182329 A1 Jun. 9, 2022

(51) Int. Cl.
*H04L 25/08* (2006.01)
*H04B 3/00* (2006.01)
*G06F 13/00* (2006.01)
*H04B 1/38* (2015.01)
*H04L 25/03* (2006.01)
*H04W 72/12* (2023.01)
*H04L 43/10* (2022.01)
*H04W 72/04* (2023.01)
*H04J 3/16* (2006.01)
(Continued)

(52) U.S. Cl.
CPC ............. *H04L 47/22* (2013.01); *H04L 63/02* (2013.01); *H04L 2012/2841* (2013.01); *H04M 1/6091* (2013.01); *H04W 84/14* (2013.01); *H04W 92/10* (2013.01)

(58) Field of Classification Search
CPC . H04L 25/0204; H04L 43/16; H04L 25/0264; H04B 10/25751; G06F 1/10; G06F 1/3234; H04N 21/43637; H04N 21/43632; H04M 1/71409
USPC .................................. 370/419, 480; 713/320
See application file for complete search history.

(56) References Cited

U.S. PATENT DOCUMENTS

2002/0025832 A1* 2/2002 Durian ................ H04M 1/6091
455/557
2002/0114301 A1* 8/2002 Yee ...................... H04B 7/2603
370/349

(Continued)

*Primary Examiner* — Khaled M Kassim
*Assistant Examiner* — Jason A Harley
(74) *Attorney, Agent, or Firm* — Artegis Law Group, LLP

(57) ABSTRACT

Various embodiments include techniques for reducing high-frequency interference to a wireless communications channel emanating from a wired communications channel. The techniques are directed towards an application that determines a mode of a particular wired communications channel. The mode of the wired communications channel is indicative of the frequency ranges at which the interference is generated. The application further determines a frequency and/or bandwidth of the wireless communications channel. The application selects a slew rate that reduces the high frequency interference from the wired communications channel at the frequency and/or bandwidth of the wireless communications channel. The application thereby optimizes the reduction of the high-frequency interference from the particular wired communications channel to the particular wireless communications channel.

19 Claims, 7 Drawing Sheets

(51) Int. Cl.
  *H04L 47/22*   (2022.01)
  *H04L 12/28*   (2006.01)
  *H04W 84/14*   (2009.01)
  *H04W 92/10*   (2009.01)
  *H04M 1/60*    (2006.01)
  *H04L 9/40*    (2022.01)

(56) References Cited

U.S. PATENT DOCUMENTS

| | | | | |
|---|---|---|---|---|
| 2005/0283749 | A1* | 12/2005 | Yeh | H03K 19/00346 |
| | | | | 714/700 |
| 2010/0052820 | A1* | 3/2010 | Wu | H01P 1/20336 |
| | | | | 333/204 |
| 2011/0089928 | A1* | 4/2011 | O'Gorman | H02M 3/33515 |
| | | | | 323/318 |
| 2015/0244752 | A1* | 8/2015 | Zhou | H04L 27/10 |
| | | | | 709/231 |
| 2016/0353162 | A1* | 12/2016 | Kan | H04N 21/42607 |
| 2017/0093197 | A1* | 3/2017 | Gao | H04W 4/80 |
| 2017/0214342 | A1* | 7/2017 | Braun | H02P 6/14 |
| 2019/0119491 | A1* | 4/2019 | Seidel | C08L 69/00 |

* cited by examiner

TECHNIQUES FOR OPTIMIZING WIRELESS COMMUNICATIONS VIA DYNAMIC SLEW RATE CONTROL OF A WIRED COMMUNICATIONS CHANNEL

BACKGROUND

Field of the Various Embodiments

Various embodiments relate generally to computer processing architectures and, more specifically, to techniques for optimizing wireless communications via dynamic slew rate control of a wired communications channel.

Description of the Related Art

Modern computer-based systems, such as, personal computers, set top boxes, gaming systems, laptop computers, and/or the like, typically include multiple wired and wireless communications channels. Such computer-based systems transmit data to and receive data from, other computer-based systems via these wired and wireless communications channels. In general, different communications channels are designed to not interfere with each other. In that regard, different wireless communications channels may operate in different frequency bands. As a result, data exchanged between computer-based systems via one communications channel operating in one frequency band do not interfere with data exchanged between computer-based systems via another communications channel operating in another frequency band. Further, wired communications channels include cables that physically connect two or more computer-based systems together to communicate with one another via these cables. As a result, data exchanged between computer-based systems via one communications channel over a first set of cables does not interfere with data exchanged between computer-based systems via another communications channel over a second set of cables.

However, under certain circumstances, one communications channel can interfere with another communications channel. In one particular example, one computer-based system can communicate with another computer-based system via a wired communications channel and, in addition, via a wireless communications channel. Metal traces on printed circuit boards included in the computer-based system carry energy between various components and also between components and various connectors associated with the computer-based system. The energy transmitted to and from connectors associated with the wired communications channel is typically in the form of digital data that is transmitted over the wired communications channel. If the cable and/or connector associated with the wired communications channel is of poor construction or is damaged, then data transmitted over the wired communications channel may generate radiated emissions in the form of radio frequency (RF) noise that include frequency content in the range of the wireless communications channel. In particular, the rising edge and falling edge of signals transmitted over the wired communications channel often generate RF noise in frequency ranges typically employed by wireless communications channels.

As a result, the RF noise generated by the wired communications channel may interfere with data transmitted over the wireless communications channel. For example, if the data rate of the data transmitted over the cable is 6 gigabits per second (Gbps), then a poorly constructed or damaged cable may generate RF noise in the range of 6 gigahertz (GHz). If the wireless communications channel operates in the 6 GHz frequency range, then the 6 GHz RF noise generated by the poorly constructed or damaged cable may interfere with data transmitted over the 6 GHz wireless communications channel.

Such interference results in desensitizing the receiver of signals via the wireless communications channel, referred to herein as desense. If the receiver of signals via the wireless communications channel is desensed, then data transmitted by one computer-based system over the wireless communications channel may need to be retransmitted multiple times until the data is successfully received by the receiving computer-based system. Under more extreme circumstances, the data may be corrupted or lost, such that the receiving computer-based system may not be able to receive the originally transmitted data.

One technique for reducing interference from a wired communications channel to a wireless communications channel is to place a low-pass filter on each of the data lanes of the wired communications channel. A low-pass filter suppresses the high-frequency content resulting from the rising and falling edges of the signals on the data lanes while allowing the lower frequency data content to pass through the filter. As a result, interference on the wireless communications channel from high-frequency content present in the wired communications channel is reduced. One drawback with this technique is that the wired communications channel may support various modes, such as 1080p video, 1080i video, 720p video, 4 k HD video, 8 k HD video, Universal Serial Bus (USB) 3.1, and/or the like. A low-pass filter that sufficiently suppresses high-frequency content for a first mode may cause signal distortion of the data content associated with a second mode. As a result, interference may be reduced when the wired communications channel is operating in the first mode, but data may not be transmittable in the second mode. Further, a low-pass filter optimized to suppress high-frequency content for a first wireless communications channel associated with a first frequency range may not be optimized to suppress high-frequency content for a second wireless communications channel associated with a second frequency range. As a result, interference may be reduced for the first wireless communications channel but not for the second wireless communications channel.

Another technique for reducing interference from a wired communications channel to a wireless communications channel is to add digital logic that changes the slew rate of signals transmitted via the data lanes of the wired communications channel. As used herein, the slew rate is the change in voltage per unit in time, expressed in measurement units of volts per second (V/s), volts per microsecond (V/µs), and/or the like. Changing the slew rate increases the rise time and fall time of the signals in the time domain, thereby reducing high-frequency content in the frequency domain. One drawback with this technique is that a slew rate that sufficiently suppresses high-frequency content for a first mode may cause signal distortion of the data content associated with a second mode. Again, interference may be reduced when the wired communications channel is operating in the first mode, but data may not be transmittable in the second mode. Further, a slew rate optimized to suppress high-frequency content for a first wireless communications channel associated with a first frequency range may not be optimized to suppress high-frequency content for a second wireless communications channel associated with a second frequency range. As a result, interference may be reduced for the first wireless communications channel but not for the second wireless communications channel.

As the foregoing illustrates, what is needed in the art are more effective techniques for reducing interference to wireless communications channels.

SUMMARY

Various embodiments of the present disclosure set forth a computer-implemented method for adjusting a slew rate of a signal associated with a first wired communications channel. The method includes detecting a first connection event associated with at least one of a first communications channel or a second communications channel, where the first communications channel comprises the first wired communications channel. The method further includes determining a first set of characteristics associated with the first communications channel. The method further includes determining a second set of characteristics associated with the second communications channel. The method further includes setting the slew rate of the signal to a first value based on the first set of characteristics and the second set of characteristics.

Other embodiments include, without limitation, a system that implements one or more aspects of the disclosed techniques, and one or more computer readable media including instructions for performing one or more aspects of the disclosed techniques.

At least one technical advantage of the disclosed techniques relative to the prior art is that, with the disclosed techniques, a slew rate is automatically selected that optimizes the reduction interference from a wired communications channel to a particular wireless communications channel that is currently in use. The selected slew rate is based on the mode of the wired communications channel and the frequency and bandwidth of the wireless communications channel. The selected slew rate may change as the mode of the wired communications channel changes and/or the frequency and bandwidth of the wireless communications channel changes. As a result, high-frequency interference from the wired communications channel is reduced without significant distortion of the data signals of the wired communications channel. These advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

As described herein, a slew rate control application executing on one or more processors detects a connection event in a wired communications channel or a wireless communications channel. In response, the slew rate control application determines a mode of the wired communications channel, such as an HDMI mode associated with a display controller. Further, the slew rate control application determines a frequency and/or a bandwidth associated with the wireless communications channel. Based on the mode of the wired communications channel and based on the frequency and/or bandwidth associated with the wireless communications channel, the slew rate control application selects a slew rate. The slew rate is optimized for reducing high-frequency interference from the wired communications channel to the particular wireless communications channel associated with the frequency and/or bandwidth.

System Overview

Figure 1:
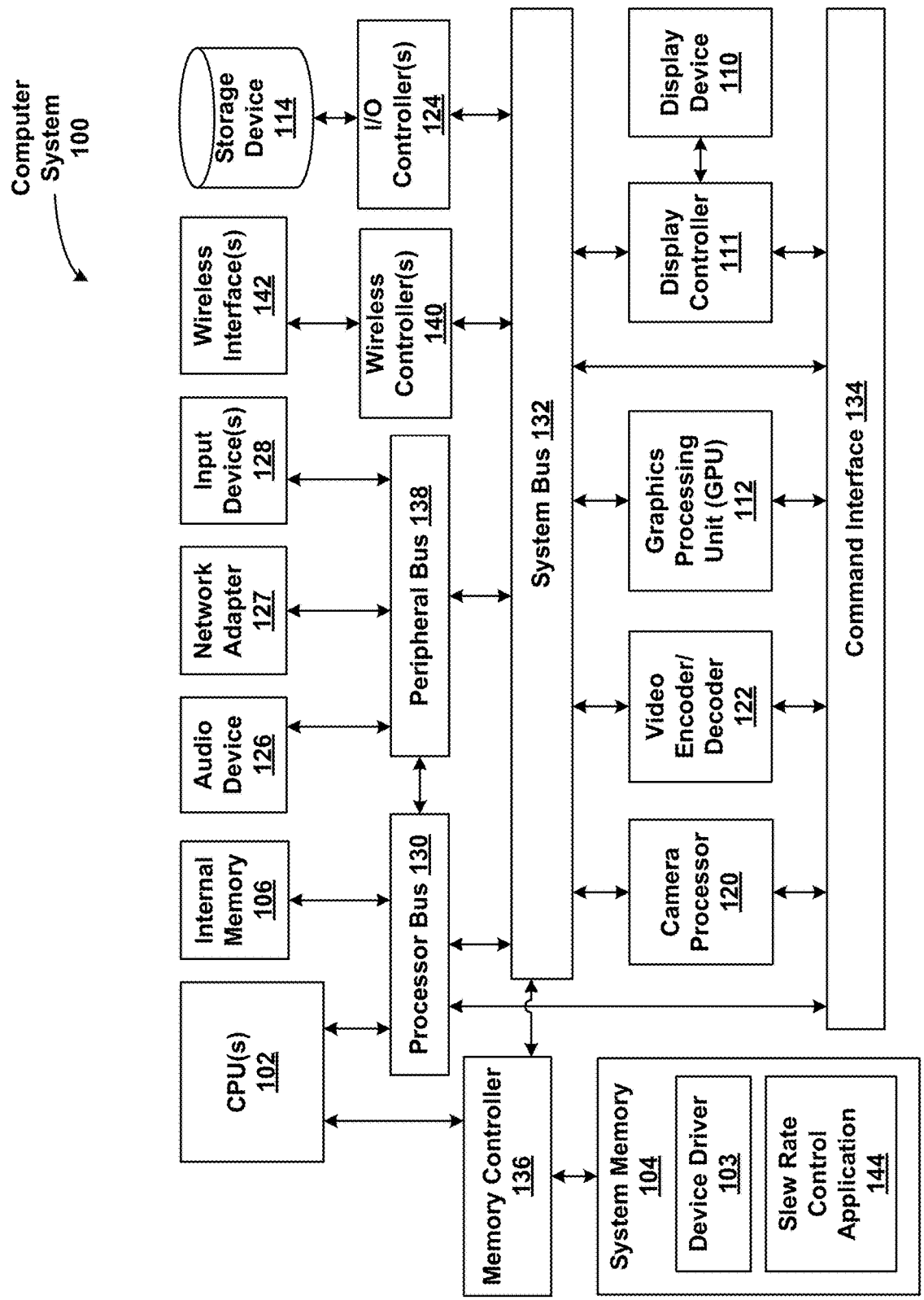
FIG. 1 is a block diagram of a computer system configured to implement one or more aspects of the various embodiments.

FIG. 1 is a block diagram of a computer system 100 configured to implement one or more aspects of the various embodiments. As shown, computer system 100 includes, without limitation, one or more central processing units (CPUs) 102 coupled to a system memory 104 via a memory controller 136. The CPU(s) 102 may further be coupled to internal memory 106 via a processor bus 130. The CPU(s) 102 are included to be representative of a single CPU, multiple CPUs, a single CPU having multiple processing cores, one or more digital signal processors (DSPs), one or more field-programmable gate arrays (FPGAs), one or more graphics processing units (CPUs), one or more tensor processing units, and/or the like. The internal memory 106 may include internal read-only memory (IROM) and/or internal random-access memory (IRAM). The computer system 100 further includes a processor bus 130, a system bus 132, a command interface 134, and a peripheral bus 138. The system bus 132 is coupled to a camera processor 120, a video encoder/decoder 122, a graphics processing unit (GPU) 112, a display controller 111, a processor bus 130, a memory controller 136, and a peripheral bus 138. The system bus 132 is further coupled to wireless interface(s) 142 via wireless controller(s) 140. The system bus 132 is further coupled to a storage device 114 via I/O controller(s) 124. The peripheral bus 138 is coupled to an audio device 126, a network adapter 127, and input device(s) 128.

In operation, the CPU(s) 102 are configured to transmit and receive memory traffic via the memory controller 136. The CPU(s) 102 are also configured to transmit and receive I/O traffic and communicate with devices connected to the system bus 132, the command interface 134, and the peripheral bus 138 via the processor bus 130. For example, the CPU(s) 102 may write commands directly to devices via the processor bus 130. Additionally, the CPU(s) 102 may write command buffers to system memory 104. The command interface 134 may then read the command buffers from system memory 104 and write the commands to the devices (such as the camera processor 120, the GPU 112, and/or the like). The command interface 134 may further provide synchronization for devices to which the command interface 134 is coupled.

The system bus 132 includes a high-bandwidth bus to which direct-memory clients may be coupled. For example, the I/O controller(s) 124 coupled to the system bus 132 may include high-bandwidth clients such as USB 2.0/3.0 controllers, flash memory controllers, and/or the like. The system bus 132 also may be coupled to middle-tier clients. For example, the I/O controller(s) 124 may include middle-tier clients such as USB 1.x controllers, multi-media card controllers, Mobile Industry Processor Interface (MIPI®) controllers, universal asynchronous receiver/transmitter (UART) controllers, and/or the like. As shown, the storage device 114 may be coupled to the system bus 132 via the I/O controller(s) 124. The storage device 114 may be configured to store content and applications and data for use by the CPU(s) 102, the GPU 112, the camera processor 120, and/or the like. As a general matter, the storage device 114 provides non-volatile storage for applications and data and may include fixed or removable hard disk drives, flash memory devices, and CD-ROM (compact disc read-only-memory), DVD-ROM (digital versatile disc-ROM), Blu-ray, and/or other magnetic, optical, and/or solid state storage devices.

Further, the wireless controller(s) 140 coupled to the system bus 132 may include various wireless clients such as wireless fidelity (WiFi) controllers, Bluetooth controllers, mobile broadband controllers, and/or the like. As shown, the wireless controller(s) 140 may be coupled to corresponding wireless interface(s) 142. The wireless interface(s) 142 may be configured to receive data from the wireless controller(s) 140 and prepare the data for transmission over one or more wireless communications channels, such as by modulating the data onto a carrier wave. Likewise, the wireless interface(s) 142 may be configured to receive signals from one or more wireless communications channels and extract the data therein, such as by demodulating the data that has been previously modulated onto a carrier wave. The wireless interface(s) 142 may then transmit the extracted data to the wireless controller(s) 140.

The peripheral bus 138 may be coupled to low-bandwidth clients. For example, the input device(s) 128 coupled to the peripheral bus 138 may include touch screen devices, keyboard devices, sensor devices, and/or the like that are configured to receive information (such as user input information, location information, orientation information, and/or the like). The input device(s) 128 may be coupled to the peripheral bus 138 via a serial peripheral interface (SPI), inter-integrated circuit (I2C), and/or the like.

In various embodiments, the system bus 132 may include an AMBA High-performance Bus (AHB), and the peripheral bus 138 may include an Advanced Peripheral Bus (APB). Additionally, in some embodiments, any device described above may be coupled to either of the system bus 132 or the peripheral bus 138, depending on the various characteristics (such as bandwidth requirements, latency requirements, and/or the like) of the device. For example, multi-media card controllers may be coupled to the peripheral bus 138.

A camera (not shown) may be coupled to the camera processor 120. The camera processor 120 includes an interface, such as a MIPI® camera serial interface (CSI). The camera processor 120 may further include an encoder pre-processor (EPP) and an image signal processor (ISP) configured to process images received from the camera. The camera processor 120 may further be configured to forward processed and/or unprocessed images to the display controller 111 via the system bus 132.

In some embodiments, GPU 112 is part of a graphics subsystem that renders pixels for a display device 110 that may be any conventional cathode ray tube, liquid crystal display, light-emitting diode display, and/or the like. In such embodiments, the GPU 112 and/or the display controller 111 incorporate circuitry optimized for graphics and video processing, including, for example, video output circuitry such as a high-definition multimedia interface (HDMI) controller, a MIPI® display serial interface (DSI) controller, a display port controller, and/or the like. In some embodiments, the GPU 112 incorporates circuitry optimized for general purpose and/or compute processing. Such circuitry may be incorporated across one or more general processing clusters (GPCs) included within GPU 112 that are configured to perform such general purpose and/or compute operations. The system memory 104 includes at least one device driver 103 configured to manage the processing operations of the GPU 112.

In various embodiments, the GPU 112 may be integrated with one or more of the other elements of FIG. 1 to form a single hardware block. For example, the GPU 112 may be integrated with the display controller 111, the camera processor 120, the video encoder/decoder 122, the audio device 126, and/or other connection circuitry included in the computer system 100.

In addition, the system memory 104 includes, without limitation, a slew rate control application 144. The slew rate control application 144, when executed by one or more processors, performs one or more operations for reducing interference on a wireless communications channel, as further described herein. More particularly, the CPU(s) 102 may execute the slew rate control application 144 to perform one or more of the techniques described herein. Additionally or alternatively, the wireless controller(s) 140, the wireless interface(s) 142, and/or the GPU(s) 112 may execute the slew rate control application 144 to perform one or more of the techniques described herein. When performing the operations associated with testing interference on a wireless communications channel, the slew rate control application 144 may store data in and retrieve data from the storage device 114.

In operation, the slew rate control application 144 selects an optimal slew rate for signals transmitted via a wired communications channel associated with the computer system 100. The selection is based on characteristics of the wired communications channel and characteristics of a wireless communications channel. The selected slew rate reduces interference at the particular frequency range associated with the wireless communications channel.

The slew rate control application 144 selects an optimal slew rate in response to a connection event. The slew rate control application 144 detects a connection event when a connector associated with the wired communications channel is removed or attached to a connector of the computer system 100. The connector may be an HDMI connector, a USB connector, a display port connector, an Ethernet connector, an InfiniBand connector, and/or the like. Additionally or alternatively, the slew rate control application 144 detects a connection event when the wireless controller(s) 140 connect to or disconnect from a wireless communications channel via the wireless interface(s) 142.

The slew rate control application 144 determines characteristics of the wired communications channel. The wired communications channel may be a video communications channel connected via the display controller 111. Additionally or alternatively, the wired communications channel may be a video or non-video data channel connected via the I/O controllers 124, the network adapter 127, and/or the like. The wired communications channel may support and be compatible with HDMI, USB, display port, Ethernet, Gigabit Ethernet, InfiniBand, and/or the like. In some embodiments, the slew rate control application 144 may determines these characteristics by transmitting a query to the display controller 111. In response, the display controller 111 may transmit the characteristics to the slew rate control application 144. The characteristics may include a mode of the wired communications channel. The mode of the wired communications channel may include a type of physical interface and a data format of the physical interface. The type of physical interface may be HDMI, USB, display port, Ethernet, InfiniBand, and/or the like. The data format of the physical interface may be 1080 progressive at 59.94 Hz (1080p/59.94 Hz), 1080p/50 Hz, 1080 interactive (1080i), 720p, 4000 high-definition (4 k HD), 8000 high-definition (8 k HD), USB 2.0, USB 3.1, and/or the like. The data rate of the signals on the wired communications channel may vary significantly with the mode. For example, the data rate in 1080p/59.94 Hz mode may be approximately 2 Gbps while the data rate in 4 k HD/60 Hz mode may be approximately 6 Gbps. Similarly, the rise time and fall time of the signals on the wired communications channel may also vary with the mode. For example, the rise time and fall time in 1080p/59.94 Hz mode may be greater than the rise time and fall time in 4 k HD/60 Hz. As a result, the amount of high-frequency interference and the frequencies at which the high-frequency interference occurs may vary with the mode.

The slew rate control application 144 further determines characteristics of the wireless communications channel. The wireless communications channel may couple the computer system 100 with the Internet. The wireless communications channel may be an Internet communications channel connected via the wireless controller(s) 140, the wireless interface(s) 142, and/or the like. In some embodiments, the slew rate control application 144 may determines these characteristics by transmitting a query to the wireless controller(s) 140 and/or the wireless interface(s) 142. In response, the wireless controller(s) 140 and/or the wireless interface(s) 142 may transmit the characteristics to the slew rate control application 144. The characteristics may include a mode of the wireless communications channel, such as the 2.4 GHz WiFi channel, the 5-6 Hz WiFi channel, the 6-7 Hz WiFi channel, Bluetooth, mobile broadband, and/or the like. The mode of the wireless communications channel may be expressed as a frequency and a bandwidth. The frequency may be a reference frequency associated with the wireless communications channel. In some embodiments, the reference frequency may be a frequency at the center of the frequency range occupied by the wireless communications channel. The bandwidth is the extent of the frequency range occupied by the wireless communications channel.

In some embodiments, the wireless communications channel communicatively couples the computer system 100 to the Internet. In such embodiments, the wireless communications channel may disconnect when a wired Ethernet connector is connected to the computer system 100. The Ethernet connector may be attached to a category (CAT) 5 cable, a CAT 6 cable, a CAT 7 cable, and/or the like. When the Ethernet connector is connected to the computer system 100, the wireless communications channel disconnects, and the computer system 100 attaches to the Internet via the Ethernet connector through the network adapter 127. Similarly, if the Ethernet connector is disconnected from the computer system 100, the computer system disconnects from the Internet via the Ethernet connector through the network adapter 127. The computer system 100 again connects to the wireless communications channel to communicatively couple the computer system 100 to the Internet.

Based on the characteristics of the wired communications channel and the characteristics of the wireless communications channel, the slew rate control application 144 selects a slew rate to apply to signals transmitted via the wired communications channel. The slew rate control application 144 applies the selected slew rate to the signals of the wired communications channel. In this manner, the slew rate applied to the signals of the wired communications channel optimizes the reduction of high-frequency interference to the particular wireless communication channel while not unnecessarily increasing the rise time and fall time of the signals. In general, decreasing the slew rate results in an increase in the rise time and fall time of the signals. Similarly, increasing the slew rate results in a decrease in the rise time and fall time of the signals.

In some embodiments, the slew rate control application 144 selects the slew rate via a mapping table. The slew rate control application 144 identifies an entry in the mapping table that corresponds to the mode of the wired communications channel, the frequency of the wireless communications channel, and the bandwidth of the wireless communications channel. The entry in the mapping table identifies the optimal slew rate for the particular mode of the wired communications channel and the frequency and bandwidth of the wireless communications channel. The optimal slew rates for each entry of the mapping table may be determined based on tests performed in a laboratory environment. After the tests are performed, the mapping table is generated based on the test results. For each combination of wired communications channel mode, wireless communications channel frequency, and wireless communications channel bandwidth, the test captures and analyzes the high-frequency interference within the wireless communications channel from the wired communications channel at each available slew rate. The optimal slew rate is the slew rate that results in a substantial reduction in high-frequency interference, and where decreasing the slew rate further results in little or no additional reduction in high-frequency interference. The mapping table is stored in memory for subsequent access by the slew rate control application 144, as described herein.

The optimal slew rate for a given combination of the wired communications channel mode and the frequency and bandwidth of the wireless communications channel may change when the layout of one or more printed circuit boards in the computer system 100 changes. Additionally or alternatively, the optimal slew rate for a given combination may change when one or more components of one or more printed circuit boards in the computer system 100 changes. Such components include the wireless controller(s) 140, the wireless interface(s) 142, the display controller 111, and/or the like. As a result, when the layout or one or more components of one or more printed circuit boards in the computer system 100 changes, the tests described herein are performed, and a new mapping table is generated. Again, the mapping table is stored in memory for subsequent access by the slew rate control application 144, as described herein.

In some embodiments, the slew rate control application 144 selects the slew rate from a fixed number of slew rates. The slew rate may be identified via an n-bit value, where the number of available slew rates is $2^n$. In some embodiments, the slew rate may be identified via a 3-bit value, where the number of available slew rates is $2^3=8$. A slew rate value of 0 may correspond to no slew rate adjustment. Slew rate values from 1 to 7 may correspond to increasing levels of slew rate adjustment. As the slew rate adjustment increases from 0 to 7, the rise time and fall time of the signals correspondingly increase and the slew rate correspondingly decreases. Similarly, as the slew rate adjustment decreases from 7 to 0, the rise time and fall time of the signals correspondingly decrease and the slew rate correspondingly increases.

In one particular example, a portion of the mapping table includes the following entries, shown below in Table 1.

TABLE 1

| Entry ID | First Channel | Second Channel | | |
|---|---|---|---|---|
| | | Frequency | Bandwidth | Slew Rate |
| 1 | HDMI 4K HD/60 Hz | Wired | | Default |
| 2 | HDMI 4K HD/60 Hz | Frequency A | Bandwidth A | Slew Rate A |
| 3 | HDMI 4K HD/60 Hz | Frequency B | Bandwidth B | Slew Rate B |
| 4 | HDMI 4K HD/60 Hz | ... | ... | ... |
| 5 | HDMI 1080 p/59/94 Hz | Wired | | Default |
| 6 | HDMI 1080 p/59/94 Hz | Frequency C | Bandwidth C | Slew Rate C |
| 7 | HDMI 1080 p/59/94 Hz | Frequency D | Bandwidth D | Slew Rate D |
| 8 | HDMI 1080 p/59/94 Hz | ... | ... | ... |
| 9 | ... | ... | ... | ... |

When the slew rate control application 144 detects a connection event, the slew rate control application 144 determines a mode of the first communications channel. If the mode of the first communications channel is HDMI 4K HD/60 Hz, then the slew rate control application 144 accesses a corresponding entry in the mapping table based on the characteristics of the second communications channel. If the second communications channel is a wired communications channel, then the slew rate control application 144 accesses entry 1 of the mapping table. Based on entry 1, the slew rate control application 144 sets the slew rate to a default value. Typically, the default value does not adjust the rise time and the fall time of the signals on the first communications channel. If the second communications channel is a wireless communications channel with a frequency 'A' and bandwidth 'A,' then the slew rate control application 144 accesses entry 2 of the mapping table. Based on entry 2, the slew rate control application 144 sets the slew rate for signals on the first communications channel to slew rate 'A.' Slew rate 'A' optimizes high-frequency interference reduction on the second communications channel with frequency 'A' and bandwidth 'A.' If the second communications channel is a wireless communications channel with a frequency 'B' and bandwidth 'B,' then the slew rate control application 144 accesses entry 3 of the mapping table. Based on entry 3, the slew rate control application 144 sets the slew rate for signals on the first communications channel to slew rate 'B.' Slew rate 'B' optimizes high-frequency interference reduction on the second communications channel with frequency 'B' and bandwidth 'B.' If the second communications channel is a wireless communications channel with a different frequency and bandwidth, then the slew rate control application 144 accesses a corresponding entry of the mapping table, as represented by entry 4.

If, however, the mode of the first communications channel is HDMI 1080p/59/94 Hz, then the slew rate control application 144 accesses a corresponding entry in the mapping table based on the characteristics of the second communications channel. If the second communications channel is a wired communications channel, then the slew rate control application 144 accesses entry 5 of the mapping table. Based on entry 5, the slew rate control application 144 sets the slew rate to a default value. Typically, the default value does not adjust the rise time and the fall time of the signals on the first communications channel. If the second communications channel is a wireless communications channel with a frequency 'C' and bandwidth 'C,' then the slew rate control application 144 accesses entry 6 of the mapping table. Based on entry 6, the slew rate control application 144 sets the slew rate for signals on the first communications channel to slew rate 'C.' Slew rate 'C' optimizes high-frequency interference reduction on the second communications channel with frequency 'C' and bandwidth 'C.' If the second communications channel is a wireless communications channel with a frequency 'D' and bandwidth 'D,' then the slew rate control application 144 accesses entry 6 of the mapping table. Based on entry 6, the slew rate control application 144 sets the slew rate for signals on the first communications channel to slew rate 'D.' Slew rate 'D' optimizes high-frequency interference reduction on the second communications channel with frequency 'D' and bandwidth 'D.' If the second communications channel is a wireless communications channel with a different frequency and bandwidth, then the slew rate control application 144 accesses a corresponding entry of the mapping table, as represented by entry 8. If, however, the mode of the first communications channel is a mode other than HDMI 4K HD/60 Hz or HDMI 1080p/59/94 Hz, then the slew rate control application 144 accesses a corresponding entry in the mapping table in the manner described above, as represented by entry 9.

It will be appreciated that the system shown herein is illustrative and that variations and modifications are possible. The connection topology, including the number and arrangement of buses, the number of CPU(s) 102, and the number of GPU(s) 112, may be modified as desired. For example, the system may implement multiple GPU(s) 112 having different numbers of processing cores, different architectures, and/or different amounts of memory. In implementations where multiple GPU(s) 112 are present, those GPU(s) 112 may be operated in parallel to process data at a higher throughput than is possible with a single GPU 112. Systems incorporating one or more GPU(s) 112 may be implemented in a variety of configurations and form factors, including, without limitation, desktops, laptops, handheld personal computers or other handheld devices, servers, workstations, game consoles, embedded systems, and/or the like. In some embodiments, the CPU(s) 102 may include one or more high-performance cores and one or more low-power cores. In addition, the CPU(s) 102 may include a dedicated boot processor that communicates with internal memory 106 to retrieve and execute boot code when the computer system 100 is powered on or resumed from a low-power mode. The boot processor may also perform low-power audio operations, video processing, math functions, system management operations, and/or the like.

The techniques described herein may be applied to any physical interface types, such as HDMI, USB, display port, Ethernet, InfiniBand, and/or the like. Further, the techniques may be applied to any video and/or non-video data formats, such as 1080 progressive at 59.94 Hz (1080p/59.94 Hz), 1080p/50 Hz, 1080 interactive (1080i), 720p, 4000 high-definition (4 k HD), 8000 high-definition (8 k HD), USB 2.0, USB 3.1, and/or the like. In addition, the techniques described herein may be applied to any one or more wireless communications channels, such as the 2.4 GHz WiFi channel, the 5-6 Hz WiFi channel, the 6-7 Hz WiFi channel, Bluetooth, mobile broadband, and/or the like.

In various embodiments, the computer system 100 may be implemented as a system on chip (SoC). In some embodiments, the CPU(s) 102 may be connected to the system bus 132 and/or the peripheral bus 138 via one or more switches or bridges (not shown). In some embodiments, the system bus 132 and the peripheral bus 138 may be integrated into a single bus instead of existing as one or more discrete buses. Lastly, in certain embodiments, one or more components shown in FIG. 1 may not be present. For example, the I/O controller(s) 124 may be eliminated, and the storage device 114 may be a managed storage device that connects directly to the system bus 132. Again, the foregoing is simply one example modification that may be made to the computer system 100. Other aspects and elements may be added to or removed from the computer system 100 in various implementations, and persons skilled in the art will understand that the description of FIG. 1 is exemplary in nature and is not intended in any way to limit the scope of the embodiments of the present disclosure.

Images generated applying one or more of the techniques disclosed herein may be displayed on a monitor or other display device. In some embodiments, the display device may be coupled directly to the system or processor generating or rendering the images. In some embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server or in a data center and the rendered images to be transmitted and displayed on one or more user devices (such as a computer, video game console, smartphone, other mobile device, and/or the like) that are physically separate from the server or data center. Hence, the techniques disclosed herein can be applied to enhance the images that are streamed and to enhance services that stream images such as NVIDIA GeForce Now (GFN), Google Stadia, and/or the like.

Figure 2:
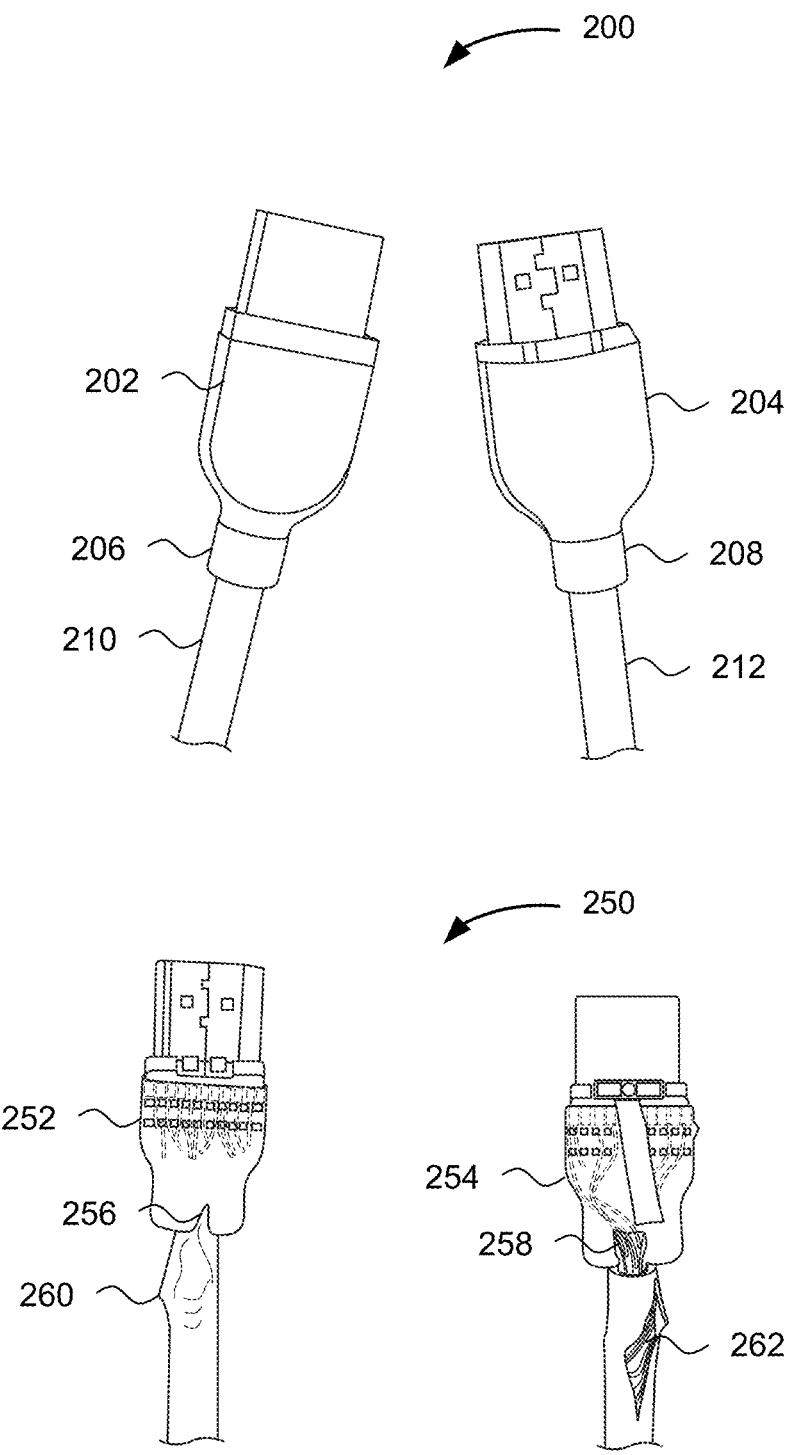
FIG. 2 illustrates a high-quality cable and a low-quality cable deployed in conjunction with the computer system of FIG. 1, according to various embodiments.

Reducing Wireless Communications Interference from a Wired Communications Channel FIG. 2 illustrates a high-quality cable 200 and a low-quality cable 250 deployed in conjunction with the computer system 100 of FIG. 1, according to various embodiments. As shown, the high-quality cable 200 has a connector, where the front side 202 and the rear side 204 of the connector are shielded via a metallic surface, metalized plastic, and/or the like. The cable portion 210 and 212 is also shielded via a metallic foil sheathing, braided metal sheathing, and/or the like. Further, the shielding of the front side 202 and the rear side 204 of the connector are connected to the shielding of the cable portion 210 and 212 via a coupling 206 and 208. No visible damage is apparent to either the front side 202 and the rear side 204 of the connector, the cable portion 210 and 212, or the coupling 206 and 208. Therefore, the signals transmitted along the wires of the high-quality cable 200, such as clock signals, data signals, control signals, and/or the like, are generally retained within the high-quality cable 200. As a result, these signals, cause little to no radiated emissions outside of the high-quality cable 200 that may interfere with wireless communications channels.

By contrast, the low-quality cable 250 has a connector, where the front side 252 and the rear side 254 of the connector are unshielded, such as a clear plastic connector or other non-metalized connector. The front side 252 of the connector includes a damaged portion 256. The rear side 254 of the connector likewise includes a damaged portion 258 where the internal wires of the low-quality cable 250 are exposed. The cable portion of the low-quality cable 250 may be shielded or unshielded. As shown, the cable portion of the low-quality cable 250 includes a damaged section 260, where any shielding in the cable portion may be compromised. Further, the cable portion of the cable portion of the low-quality cable 250 includes a torn section 262, where the shielding and internal wires of the low-quality cable 250 are exposed. The low-quality cable 250 does not include any coupling between the connector and the cable portion. As a result, the signals transmitted along the wires of the high-quality cable 200, such as clock signals, data signals, control signals, and/or the like, may generate radiated emissions outside of the low-quality cable 250 that may interfere with wireless communications channels.

A user of a system, such as the computer system 100 of FIG. 1, may be unable to determine whether a high-quality cable 200 or a low-quality cable 250 is installed. Further, whether a high-quality cable 200 or a low-quality cable 250 is installed, the user may be unable to tell if the cable is generating emitted radiation that is causing performance degradation in one or more wireless communications channels. Instead, the user may experience degraded performance on one or more wireless communications channels without knowing the root cause of the performance degradation. Via the techniques described herein, the computer system 100 may perform a test to determine if a high-quality cable 200 is installed, resulting in little to no emitted radiation interfering with one or more wireless communications channels. Likewise, the computer system 100 may perform the test to determine if a low-quality cable 250 is installed, resulting in emitted radiation that interferes with one or more wireless communications channels.

Figure 3:
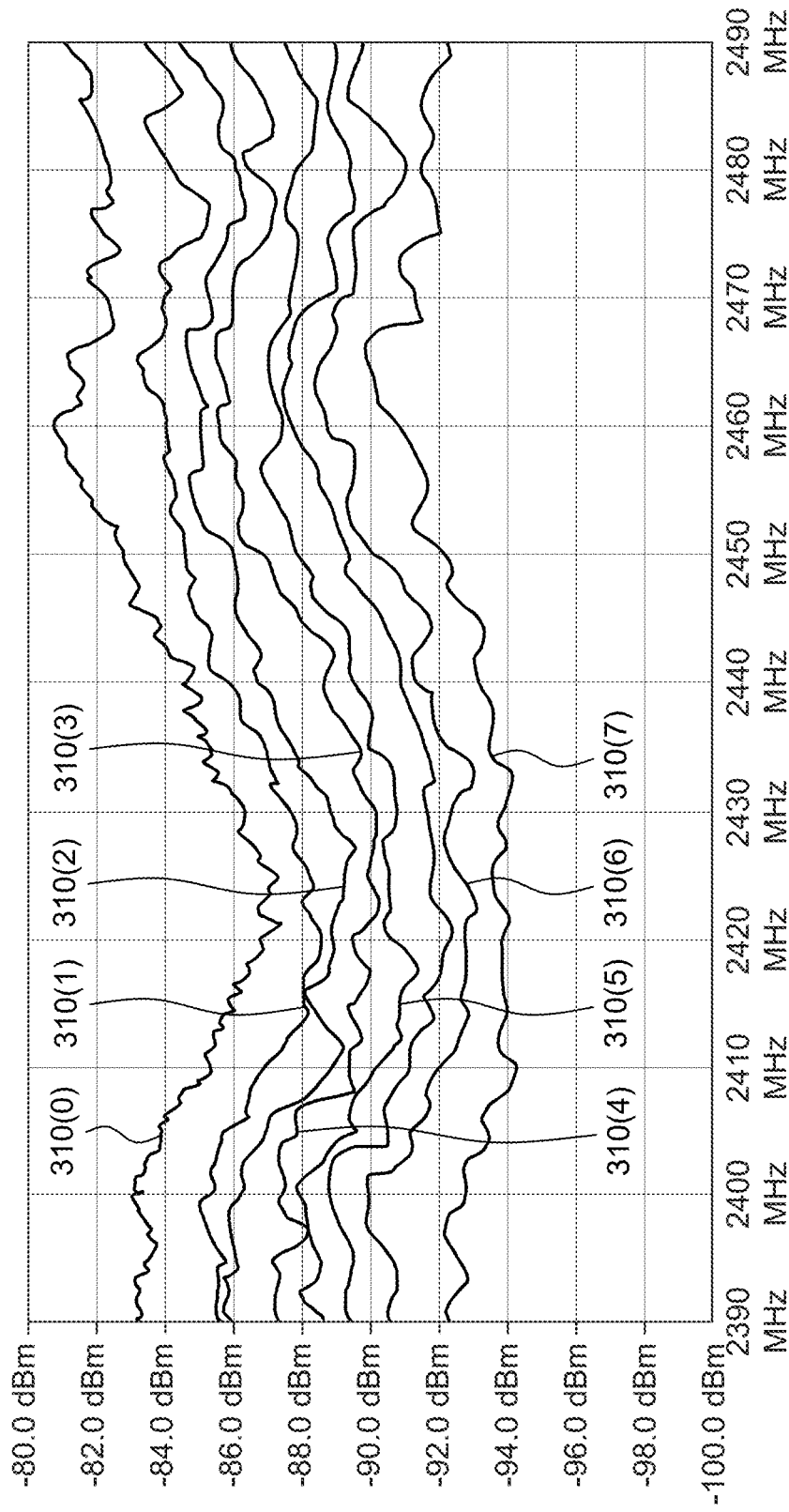
FIG. 3 illustrates frequency spectrum diagrams of high-frequency interference signals from a wired communications channel to a first wireless communications channel, according to various embodiments.

FIG. 3 illustrates frequency spectrum diagrams 300 of high-frequency interference signals from a wired communications channel to a first wireless communications channel, according to various embodiments. As shown, the waveforms 300 illustrate high-frequency interference in the 2.4 GHz wireless communications channel in the frequency range of 2390 MHz to 2485 MHz. The source of the high-frequency interference is a 4 k HD/60 Hz wired communications channel that is generating RF noise in the frequency range of the 2.4 GHz wireless communications channel. The eight waveforms 310(0)-310(7) correspond to eight different slew rates, slew rate 0 through slew rate 7, applied to one or more signals of the wired communications channel. Waveform 310(0) corresponds to slew rate 0, where slew rate 0 does not modify the rise time and fall time of the signals of the wired communications channel. Waveforms 310(1)-310(7) corresponds to slew rates 1-7, respectively, where slew rates 1-7 incrementally increase the rise time and fall time of the signals of the wired communications channel. Correspondingly, slew rates 1-7 incrementally decrease the slew rate of the signals of the wired communications channel.

Waveform 310(0) indicates that the high-frequency interference is in the range of −82 dBm. Each increase of the slew rate from slew rates 1 to slew rate 7 further decreases the high-frequency interference in the 2.4 GHz band, as shown by waveforms 310(1)-310(7), respectively. Waveform 310(7) shows the greatest reduction in high-frequency interference, in the range of −92 dBm. Therefore, slew rate 7 provides the optimal reduction in high-frequency interference in the 2.4 GHz band.

Figure 4:
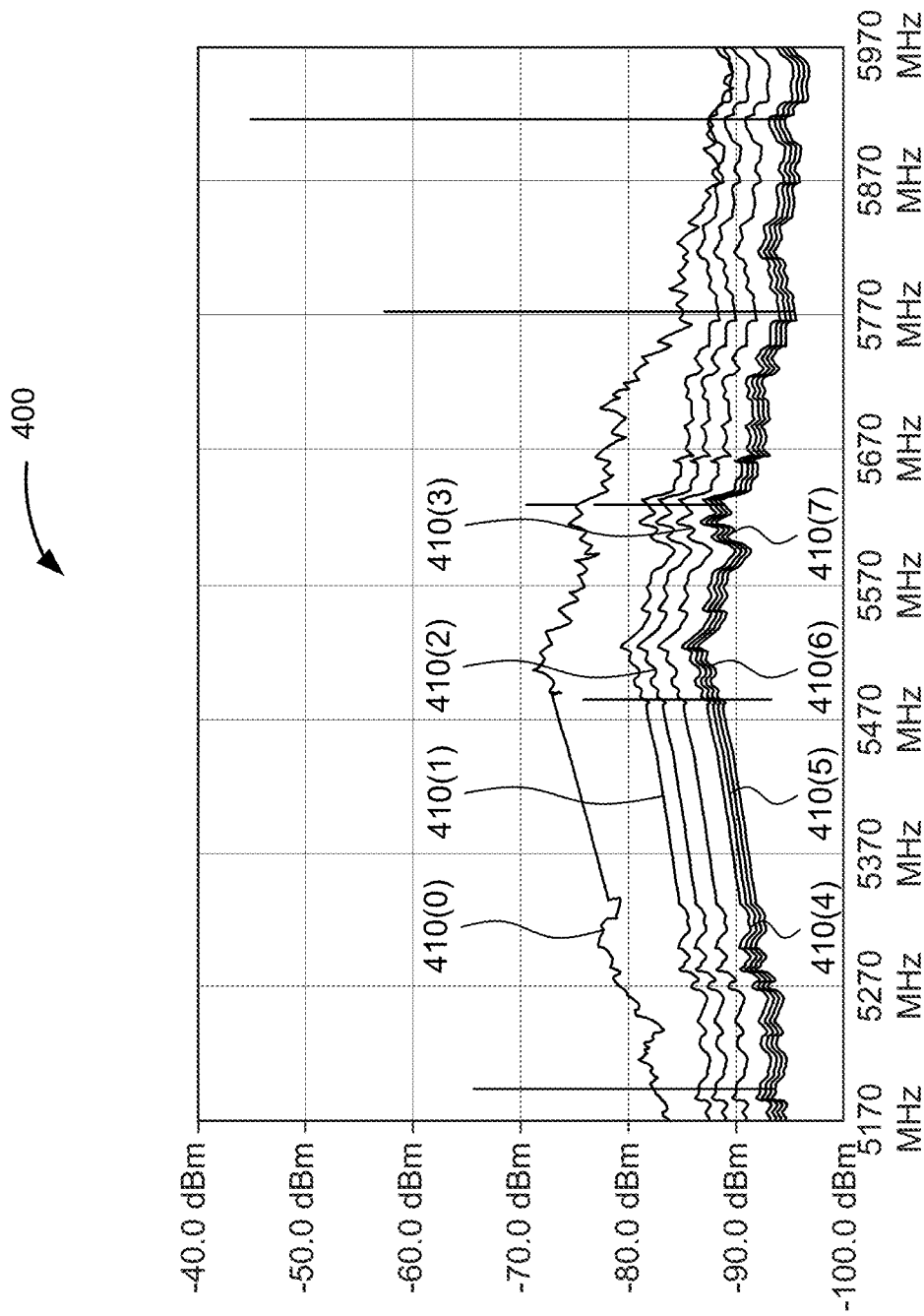
FIG. 4 illustrates frequency spectrum diagrams of high-frequency interference signals from a wired communications channel to a second wireless communications channel, according to various embodiments.

FIG. 4 illustrates frequency spectrum diagrams 400 of high-frequency interference signals from a wired communications channel to a second wireless communications channel, according to various embodiments. As shown, the waveforms 400 illustrate high-frequency interference in the 5-6 GHz wireless communications channel in the frequency range of 5170 MHz to 5970 MHz. The source of the high-frequency interference is a 4 k HD/60 Hz wired communications channel that is generating RF noise in the frequency range of the 5-6 GHz wireless communications channel. The eight waveforms 410(0)-410(7) correspond to eight different slew rates, slew rate 0 through slew rate 7, applied to one or more signals of the wired communications channel. Waveform 410(0) corresponds to slew rate 0, where slew rate 0 does not modify the rise time and fall time of the signals of the wired communications channel. Waveforms 410(1)-410(7) corresponds to slew rates 1-7, respectively, where slew rates 1-7 incrementally increase the rise time and fall time of the signals of the wired communications channel. Correspondingly, slew rates 1-7 incrementally decrease the slew rate of the signals of the wired communications channel.

Waveform 410(0) indicates that the high-frequency interference is in the range of −80 to −90 dBm. Waveforms 410(1)-410(4) indicate that increasing the slew rate to slew rate 1 decreases the high-frequency interference in the 5-6 GHz band to a range of −85 to −95 dBm. Each further increase of the slew rate from slew rates 5 to slew rate 7 provide little to no additional reduction in the high-frequency interference in the 5-6 GHz band, as shown by waveforms 410(5)-410(7), respectively. Therefore, slew rate 4 provides the optimal reduction in high-frequency interference in the 5-6 GHz band.

Figure 5:
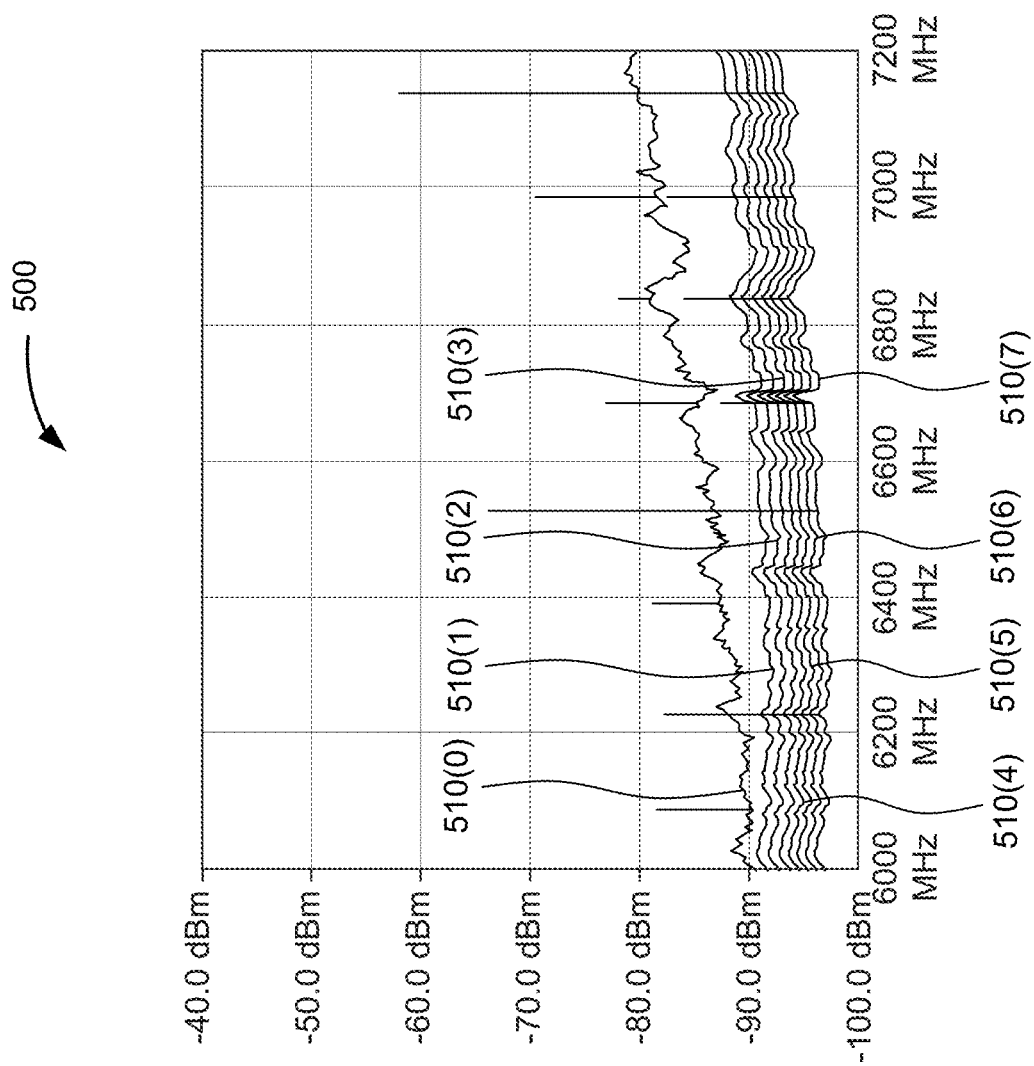
FIG. 5 illustrates frequency spectrum diagrams of high-frequency interference signals from a wired communications channel to a third wireless communications channel, according to various embodiments.

FIG. 5 illustrates frequency spectrum diagrams 500 of high-frequency interference signals from a wired communications channel to a third wireless communications channel, according to various embodiments. As shown, the waveforms 500 illustrate high-frequency interference in the 6-7 GHz wireless communications channel in the frequency range of 6000 MHz to 7200 MHz. The source of the high-frequency interference is a 4 k HD/60 Hz wired communications channel that is generating RF noise in the frequency range of the 6-7 GHz wireless communications channel. The eight waveforms 510(0)-510(7) correspond to eight different slew rates, slew rate 0 through slew rate 7, applied to one or more signals of the wired communications channel. Waveform 510(0) corresponds to slew rate 0, where slew rate 0 does not modify the rise time and fall time of the signals of the wired communications channel. Waveforms 510(1)-510(7) corresponds to slew rates 1-7, respectively, where slew rates 1-7 incrementally increase the rise time and fall time of the signals of the wired communications channel. Correspondingly, slew rates 1-7 incrementally decrease the slew rate of the signals of the wired communications channel.

Waveform 510(0) indicates that the high-frequency interference is in the range of −80 to −90 dBm. Waveform 510(1) indicates that increasing the slew rate to slew rate 1 decreases the high-frequency interference in the 6-7 GHz band to a range of −90 to −95 dBm. Each further increase of the slew rate from slew rates 2 to slew rate 7 provide little to no additional reduction in the high-frequency interference in the 6-7 GHz band, as shown by waveforms 510(2)-510(7), respectively. Therefore, slew rate 1 provides the optimal reduction in high-frequency interference in the 6-7 GHz band.

Figure 6:
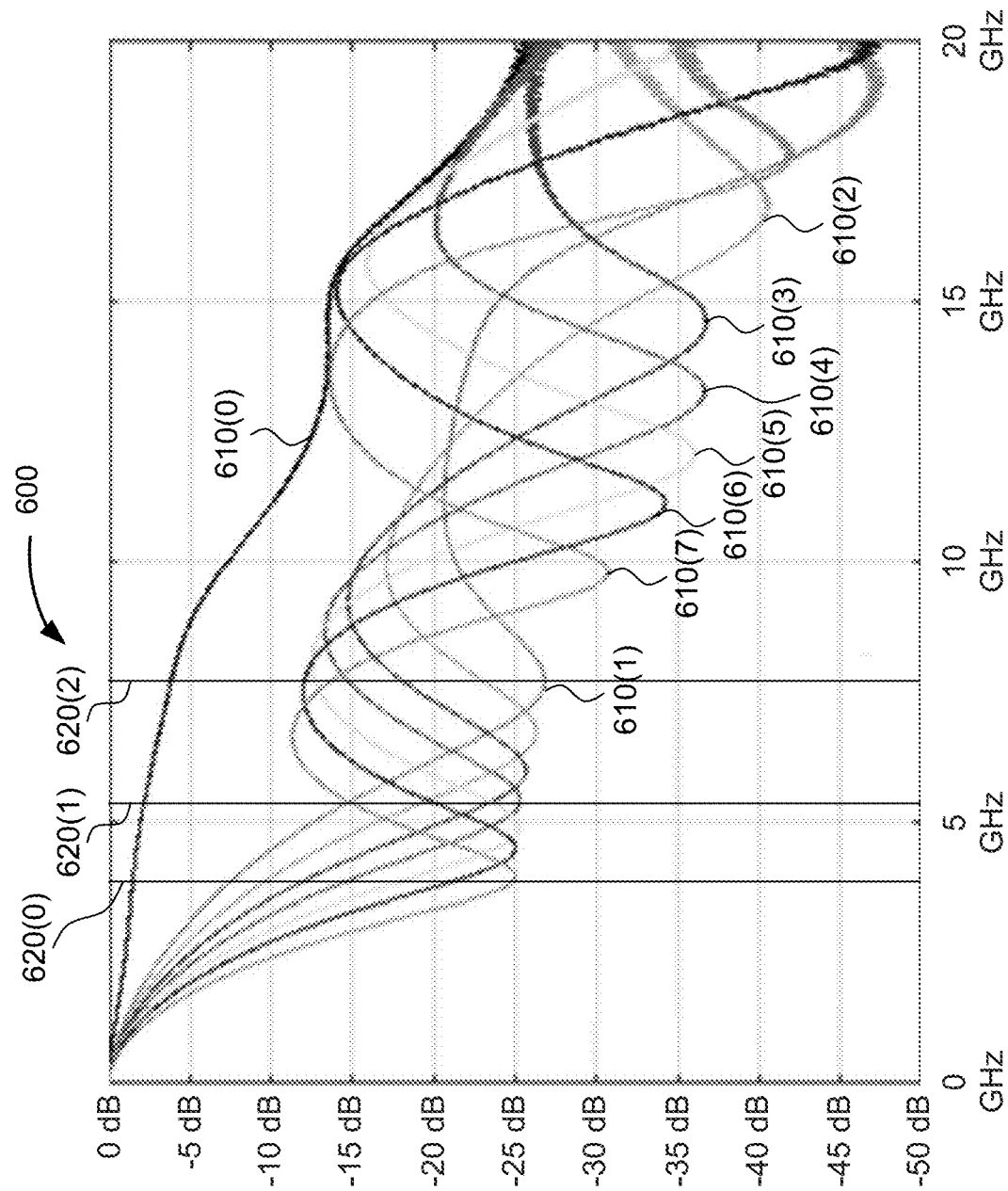
FIG. 6 illustrates transfer functions for various slew rate values applied to a wired communications channel, according to various embodiments.

FIG. 6 illustrates transfer functions 600 for various slew rate values applied to a wired communications channel, according to various embodiments. The eight waveforms 610(0)-610(7) show the insertion loss at various frequencies corresponding to eight different slew rates, slew rate 0 through slew rate 7, applied to one or more signals of the wired communications channel. As shown, in the 2.4 GHz band, represented by frequency line 620(0), the greatest insertion loss occurs with slew rate 7, because waveform 610(7) shows the lowest value of the eight waveforms 610(0)-610(7) at frequency line 620(0). Therefore, slew rate 7 provides the optimal reduction of high-frequency interference in the 2.4 GHz band. In the 5-6 GHz band, represented by frequency line 620(1), the greatest insertion loss occurs with slew rate 4, because waveform 610(4) shows the lowest value of the eight waveforms 610(0)-610(7) at frequency line 620(1). Therefore, slew rate 4 provides the optimal reduction of high-frequency interference in the 5-6 GHz band. In the 6-7 GHz band, represented by frequency line 620(2), the greatest insertion loss occurs with slew rate 1, because waveform 610(1) shows the lowest value of the eight waveforms 610(0)-610(7) at frequency line 620(2). Therefore, slew rate 1 provides the optimal reduction of high-frequency interference in the 6-7 GHz band. Accordingly, for a given wired communications channel, the optimum slew rate is different depending on the frequency and bandwidth of the wireless communications channel.

Figure 7:
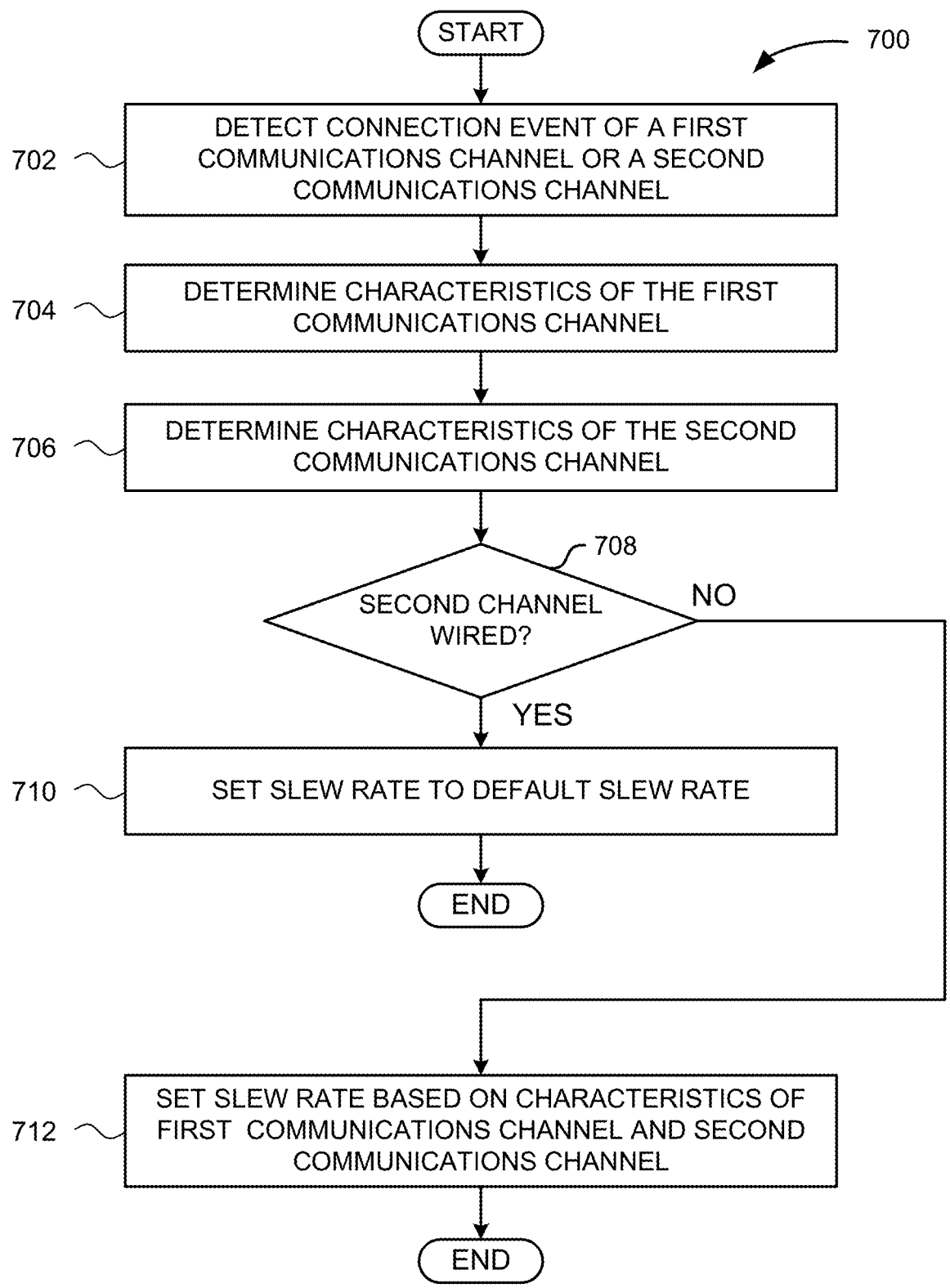
FIG. 7 illustrates a flow diagram of method steps for adjusting a slew rate of signals associated with a wired communications channel via the computer system of FIG. 1, according to various embodiments.

FIG. 7 illustrates a flow diagram of method steps for adjusting a slew rate of signals associated with a wired communications channel via the computer system of FIG. 1, according to various embodiments. Although the method steps are described in conjunction with the systems of FIGS. 1-6, persons of ordinary skill in the art will understand that any system configured to perform the method steps, in any order, is within the scope of the present disclosure.

As shown, a method 700 begins at step 702, where a slew rate control application 144, executed by one or more processors, detects a connection event of a first communications channel or a second communications channel. The slew rate control application 144 detects a connection event when a connector associated with a wired communications channel is removed or attached to a connector of the computer system 100. The connector may be an HDMI connector, a USB connector, a display port connector, an Ethernet connector, an InfiniBand connector, and/or the like. Additionally or alternatively, the slew rate control application 144 detects a connection event when the wireless controller(s) 140 connect to or disconnect from a wireless communications channel via the wireless interface(s) 142.

At step 704, the slew rate control application 144 determines characteristics of the first communications channel.

The first communications channel may be a first communications channel for transmitting video and/or non-video data signals. The wired communications channel may be a video communications channel connected via the display controller 111. Additionally or alternatively, the wired communications channel may be a video or non-video data channel connected via the I/O controllers 124, the network adapter 127, and/or the like. In some embodiments, the slew rate control application 144 may determines these characteristics by transmitting a query to the display controller 111. In response, the display controller 111 may transmit the characteristics to the slew rate control application 144. The characteristics may include a mode of the wired communications channel. The mode of the wired communications channel may include a type of physical interface and a data format of the physical interface. The type of physical interface may be HDMI, USB, display port, Ethernet, InfiniBand, and/or the like. The data format of the physical interface may be 1080 progressive at 59.94 Hz (1080p/59.94 Hz), 1080p/50 Hz, 1080 interactive (1080i), 720p, 4000 high-definition (4 k HD), 8000 high-definition (8 k HD), USB 2.0, USB 3.1, and/or the like. The data rate of the signals on the wired communications channel may vary significantly with the mode. For example, the data rate in 1080p/59.94 Hz mode may be approximately 2 Gbps while the data rate in 4 k HD/60 Hz mode may be approximately 6 Gbps. Similarly, the rise time and fall time of the signals on the wired communications channel may also vary with the mode. For example, the rise time and fall time in 1080p/59.94 Hz mode may be greater than the rise time and fall time in 4 k HD/60 Hz. As a result, the amount of high-frequency interference and the frequencies at which the high-frequency interference occurs may vary with the mode.

At step 706, the slew rate control application 144 further determines characteristics of the second communications channel. The second communications channel may be a wireless or wired communications channel for coupling the computer system 100 with the Internet. A wireless communications channel may be an Internet communications channel connected via the wireless controller(s) 140, the wireless interface(s) 142, and/or the like. In some embodiments, the slew rate control application 144 may determines these characteristics by transmitting a query to the wireless controller(s) 140 and/or the wireless interface(s) 142. In response, the wireless controller(s) 140 and/or the wireless interface(s) 142 may transmit the characteristics to the slew rate control application 144. The characteristics may include a mode of the wireless communications channel, such as the 2.4 GHz WiFi channel, the 5-6 Hz WiFi channel, the 6-7 Hz WiFi channel, Bluetooth, mobile broadband, and/or the like. The mode of the wireless communications channel may be expressed as a frequency and a bandwidth. The frequency may be a reference frequency associated with the wireless communications channel. In some embodiments, the reference frequency may be a frequency at the center of the frequency range occupied by the wireless communications channel. The bandwidth is the extent of the frequency range occupied by the wireless communications channel.

In some embodiments, the wireless communications channel communicatively couples the computer system 100 to the Internet. In such embodiments, the wireless communications channel may disconnect when a wired Ethernet connector is connected to the computer system 100. The Ethernet connector may be attached to a category (CAT) 5 cable, a CAT 6 cable, a CAT 7 cable, and/or the like. When the Ethernet connector is connected to the computer system 100, the wireless communications channel disconnects, and the computer system 100 attaches to the Internet via the Ethernet connector through the network adapter 127. Similarly, if the Ethernet connector is disconnected from the computer system 100, the computer system disconnects from the Internet via the Ethernet connector through the network adapter 127. The computer system 100 again connects to the wireless communications channel to communicatively couple the computer system 100 to the Internet.

At step 708, the slew rate control application 144 determines whether the second communications channel is a wired communications channel. If the second communications channel is a wired communications channel, then the method 700 proceeds to step 710, where slew rate control application 144 sets the slew rate to a default slew rate. Typically, the default slew rate does not adjust the rise time and the fall time of the signals on the first communications channel. The method 700 then terminates. Alternatively, the method proceeds to step 702, described above, where the slew rate control application 144 continues to monitor for additional connection events.

If, at step 708, the second communications channel is not a wired communications channel, then the second communications channel is a wireless communications channel. In such cases, the method 700 proceeds to step 712, where slew rate control application 144 sets the slew rate based on the characteristics of the first communications channel and the second communications channel. The slew rate control application 144 applies the selected slew rate to the signals of the wired communications channel. In this manner, the slew rate applied to the signals of the wired communications channel optimizes the reduction of high-frequency interference to the particular wireless communication channel while not unnecessarily increasing the rise time and fall time of the signals. In general, decreasing the slew rate results in an increase in the rise time and fall time of the signals. Similarly, increasing the slew rate results in a decrease in the rise time and fall time of the signals.

In some embodiments, the slew rate control application 144 selects the slew rate via a mapping table. The slew rate control application 144 identifies an entry in the mapping table that corresponds to the mode of the wired communications channel, the frequency of the wireless communications channel, and the bandwidth of the wireless communications channel. The entry in the mapping table identifies the optimal slew rate for the particular mode of the wired communications channel and the frequency and bandwidth of the wireless communications channel. The optimal slew rates for each entry of the mapping table may be determined based on tests performed in a laboratory environment. After the tests are performed, the mapping table is generated based on the test results. For each combination of wired communications channel mode, wireless communications channel frequency, and wireless communications channel bandwidth, the test captures and analyzes the high-frequency interference within the wireless communications channel from the wired communications channel at each available slew rate. The optimal slew rate is the slew rate that results in a substantial reduction in high-frequency interference, and where decreasing the slew rate further results in little or no additional reduction in high-frequency interference. The mapping table is stored in memory for subsequent access by the slew rate control application 144, as described herein.

The optimal slew rate for a given combination of the wired communications channel mode and the frequency and bandwidth of the wireless communications channel may change when the layout of one or more printed circuit boards in the computer system 100 changes. Additionally or alternatively, the optimal slew rate for a given combination may change when one or more components of one or more printed circuit boards in the computer system 100 changes. Such components include the wireless controller(s) 140, the wireless interface(s) 142, the display controller 111, and/or the like. As a result, when the layout or one or more components of one or more printed circuit boards in the computer system 100 changes, the tests described herein are performed, and a new mapping table is generated. Again, the mapping table is stored in memory for subsequent access by the slew rate control application 144, as described herein.

The method 700 then terminates. Alternatively, the method proceeds to step 702, described above, where the slew rate control application 144 continues to monitor for additional connection events.

In sum, a slew rate control application executing on one or more processors detects a connection event in a wired communications channel or a wireless communications channel. In response, the slew rate control application determines a mode of the wired communications channel, such as an HDMI mode associated with a display controller. Further, the slew rate control application determines a frequency and/or a bandwidth associated with the wireless communications channel. Based on the mode of the wired communications channel and based on the frequency and/or bandwidth associated with the wireless communications channel, the slew rate control application selects a slew rate. The slew rate is optimized for reducing high-frequency interference from the wired communications channel to the particular wireless communications channel associated with the frequency and/or bandwidth.

At least one technical advantage of the disclosed techniques relative to the prior art is that, with the disclosed techniques, a slew rate is automatically selected that optimizes the reduction interference from a wired communications channel to a particular wireless communications channel that is currently in use. The selected slew rate is based on the mode of the wired communications channel and the frequency and bandwidth of the wireless communications channel. The selected slew rate may change as the mode of the wired communications channel changes and/or the frequency and bandwidth of the wireless communications channel changes. As a result, high-frequency interference from the wired communications channel is reduced without significant distortion of the data signals of the wired communications channel. These advantages represent one or more technological improvements over prior art approaches.

Any and all combinations of any of the claim elements recited in any of the claims and/or any elements described in this application, in any fashion, fall within the contemplated scope of the present disclosure and protection.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, and/or the like) or an embodiment combining software and hardware aspects that may all generally be referred to herein as a module or system. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for adjusting a slew rate of a signal associated with a wired communications channel, the method comprising:
    detecting a first connection event associated with at least one of the wired communications channel or a wireless communications channel, wherein the first connection event includes at least one of: (1) a removal or attachment of a connector associated with the wired communications channel, or (2) a connection to or disconnection from a wireless communications channel;
    determining a first set of characteristics associated with the wired communications channel, wherein the first set of characteristics includes a first mode that identifies at least one of a type of a physical interface or a data format of the physical interface;
    determining a second set of characteristics associated with the wireless communications channel, wherein the second set of characteristics includes a second mode that identifies at least one of a frequency of the wireless communications channel or a bandwidth of the wireless communications channel, and wherein the first set of characteristics causes the wired communications channel to interfere with the wireless communications channel at one or more frequencies associated with the second set of characteristics; and
    adjusting the slew rate of the signal to a first value based on the first set of characteristics and the second set of characteristics, wherein an insertion loss in the wired communications channel at the one or more frequencies increases when the slew rate is adjusted to the first value.

2. The computer-implemented method of claim 1, further comprising:
    detecting a second connection event associated with the wired communications channel;
    determining a third set of characteristics associated with the wired communications channel; and
    modifying, based on the second set of characteristics and the third set of characteristics, the slew rate of the signal from the first value to a second value.

3. The computer-implemented method of claim 1, wherein
    the second set of characteristics comprises a wireless mode associated with at least one of:
        a first frequency associated with the wireless communications channel, or
        a first bandwidth associated with the wireless communications channel;
    and further comprising:
    adjusting the slew rate of the signal to the first value reduces interference when operating in the wireless mode.

4. The computer-implemented method of claim 3, further comprising:
    detecting a second connection event associated with the wireless communications channel;
    determining a third set of characteristics associated with the wireless communications channel, wherein the third set of characteristics comprises at least one of:
        a second frequency associated with the wireless communications channel, or
        a second bandwidth associated with the wireless communications channel; and
    modifying, based on the first set of characteristics and the third set of characteristics, the slew rate of the signal from the first value to a second value.

5. The computer-implemented method of claim 1, wherein the wired communications channel is connected via a physical interface comprising at least one of a high-definition multimedia interface (HDMI) connector, a Universal Serial Bus (USB) connector, a display port connector, an Ethernet connector, or an InfiniBand connector.

6. The computer-implemented method of claim 1, wherein the wireless communications channel is connected via a wireless fidelity (WiFi) controller, a Bluetooth controller, or a mobile broadband controller.

7. The computer-implemented method of claim 1, wherein adjusting the slew rate of the signal to the first value comprises:
    identifying, in a mapping table, an entry that is associated with (i) a first characteristic included in the first set of characteristics and (ii) a second characteristic included in the second set of characteristics; and
    setting the slew rate to a slew rate value included in the entry.

8. The computer-implemented method of claim 1, wherein adjusting the slew rate to the first value reduces interference on the wireless communications channel operating within a first frequency range.

9. The computer-implemented method of claim 1, wherein adjusting the slew rate to the first value minimizes the insertion loss on the wireless communications channel operating within a first frequency range.

10. The computer-implemented method of claim 1, further comprising:
    determining an optimal slew rate, associated with a reduction in interference on the wireless communications channel when the wired communications channel is operating using the first set of characteristics and the wireless communications channel is operating using the second set of characteristics; and
    setting the first value to the optimal slew rate.

11. One or more non-transitory computer-readable media storing program instructions that, when executed by one or more processors, cause the one or more processors to perform steps of:
    detecting a first connection event associated with at least one of a wired communications channel or a wireless communications channel, wherein the first connection event includes at least one of: (1) a removal or attachment of a connector associated with the wired communications channel, or (2) a connection to or disconnection from a wireless communications channel;
    determining a first set of characteristics associated with the wired communications channel, wherein the first set of characteristics includes a first mode that identifies at least one of a type of a physical interface or a data format of the physical interface;
    determining a second set of characteristics associated with the wireless communications channel, wherein the second set of characteristics includes a second mode that identifies at least one of a frequency of the wireless communications channel or a bandwidth of the wireless communications channel, and wherein the first set of characteristics causes the wired communications channel to interfere with the wireless communications channel at one or more frequencies associated with the second set of characteristics; and
    adjusting a slew rate of a signal associated with a wired communications channel to a first value based on the first set of characteristics and the second set of characteristics, wherein an insertion loss in the wired communications channel at the one or more frequencies increases when the slew rate is adjusted to the first value.

12. The one or more non-transitory computer-readable media of claim 11, further comprising:
   detecting a second connection event associated with the wired communications channel;
   determining a third set of characteristics associated with the wired communications channel; and
   modifying, based on the second set of characteristics and the third set of characteristics, the slew rate of the signal from the first value to a second value.

13. The one or more non-transitory computer-readable media of claim 11, wherein:
   the second set of characteristics comprises a wireless mode associated with at least one of:
      a first frequency associated with the wireless communications channel, or
      a first bandwidth associated with the wireless communications channel; and
   adjusting the slew rate of the signal to the first value reduces interference when operating in the wireless mode.

14. The one or more non-transitory computer-readable media of claim 13, further comprising:
   detecting a second connection event associated with the wireless communications channel;
   determining a third set of characteristics associated with the wireless communications channel, wherein the third set of characteristics comprises at least one of:
      a second frequency associated with the wireless communications channel, or
      a second bandwidth associated with the wireless communications channel; and
   modifying, based on the first set of characteristics and the third set of characteristics, the slew rate of the signal from the first value to a second value.

15. The one or more non-transitory computer-readable media of claim 11, wherein the wired communications channel is connected via a physical interface comprising at least one of a high-definition multimedia interface (HDMI) connector, a Universal Serial Bus (USB) connector, a display port connector, an Ethernet connector, or an InfiniBand connector.

16. The one or more non-transitory computer-readable media of claim 11, wherein adjusting the slew rate of the signal to the first value comprises:
   identifying, in a mapping table, an entry that is associated with (i) a first characteristic included in the first set of characteristics and (ii) a second characteristic included in the second set of characteristics; and
   setting the slew rate to a slew rate value included in the entry.

17. A system, comprising:
a memory storing instructions; and
a processor that is coupled to the memory and, when executing the instructions:
   detects a first connection event associated with at least one of a wired communications channel or a wireless communications channel, wherein the first connection event includes at least one of: (1) a removal or attachment of a connector associated with the wired communications channel, or (2) a connection to or disconnection from a wireless communications channel;
   determines a first set of characteristics associated with the wired communications channel, wherein the first set of characteristics includes a first mode that identifies at least one of a type of a physical interface or a data format of the physical interface;
   determines a second set of characteristics associated with the wireless communications channel, wherein the second set of characteristics includes a second mode that identifies at least one of a frequency of the wireless communications channel or a bandwidth of the wireless communications channel, and wherein the first set of characteristics causes the wired communications channel to interfere with the wireless communications channel at one or more frequencies associated with the second set of characteristics; and
   adjusts a slew rate of a signal associated with a wired communications channel to a first value based on the first set of characteristics and the second set of characteristics, wherein an insertion loss in the wired communications channel at the one or more frequencies increases when the slew rate is adjusted to the first value.

18. The system of claim 17, wherein the wired communications channel is connected via a high-definition multimedia interface (HDMI) connector, a Universal Serial Bus (USB) connector, a display port connector, an Ethernet connector, or an InfiniBand connector.

19. The system of claim 17, wherein the wireless communications channel is connected via a wireless fidelity (WiFi) controller, a Bluetooth controller, or a mobile broadband controller.

* * * * *